United States Patent
Thacker et al.

(10) Patent No.: US 8,671,694 B2
(45) Date of Patent: Mar. 18, 2014

(54) METHODS AND APPARATUS FOR DILUENT NITROGEN SATURATION

(75) Inventors: Pradeep S. Thacker, Bellaire, TX (US); Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 1086 days.

(21) Appl. No.: 12/695,422

(22) Filed: Jan. 28, 2010

(65) Prior Publication Data

US 2011/0179801 A1 Jul. 28, 2011

(51) Int. Cl.
*F02C 1/00* (2006.01)
*F02C 6/08* (2006.01)

(52) U.S. Cl.
USPC ............................................. 60/772; 60/782

(58) Field of Classification Search
USPC ......... 60/780, 39.464, 39.465, 801, 782, 785, 60/39.52; 208/179; 585/240
See application file for complete search history.

(56) References Cited

U.S. PATENT DOCUMENTS

| | | | |
|---|---|---|---|
| 4,729,217 A | 3/1988 | Kehlhofer | |
| 4,731,989 A | 3/1988 | Furuya et al. | |
| 5,251,433 A * | 10/1993 | Wallace | 60/775 |
| 5,295,350 A * | 3/1994 | Child et al. | 60/780 |
| 5,388,395 A | 2/1995 | Scharpf et al. | |
| 5,410,869 A | 5/1995 | Muller | |
| 6,343,462 B1 | 2/2002 | Drnevich et al. | |
| 6,519,945 B2 | 2/2003 | Arar et al. | |
| 6,588,212 B1 | 7/2003 | Wallace et al. | |
| 7,464,555 B2 | 12/2008 | Bachovchin et al. | |
| 2007/0082306 A1* | 4/2007 | Drnevich et al. | 431/12 |

* cited by examiner

*Primary Examiner* — Gerald L Sung
*Assistant Examiner* — Scott Walthour
(74) *Attorney, Agent, or Firm* — Armstrong Teasdale LLP

(57) ABSTRACT

In one aspect, an embodiment of the present disclosure provides an Integrated Gasification Combined Cycle (IGCC) apparatus. The apparatus includes a saturator configured to saturate NPG with water vapor, and a heat recovery steam generator (HRSG), a low pressure steam loop through the saturator, wherein the HRSG is configured to heat the low pressure steam loop. The apparatus further includes a compressor and a heat exchanger configured to heat the NPG using waste process heat and extraction air from the compressor, wherein the heated NPG thereby becomes diluent nitrogen.

15 Claims, 1 Drawing Sheet

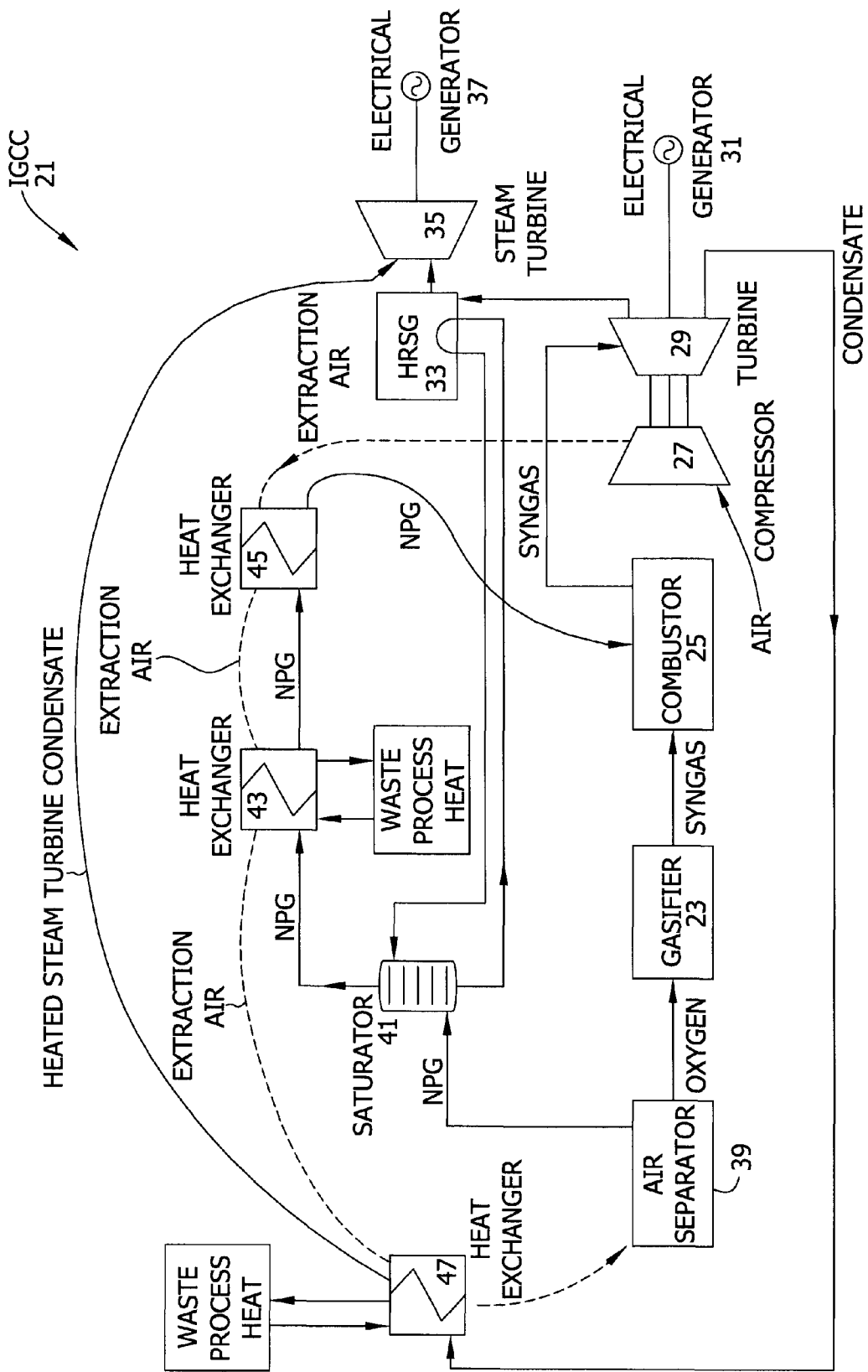

METHODS AND APPARATUS FOR DILUENT NITROGEN SATURATION

BACKGROUND

The present invention relates generally to Integrated Gasification Combined Cycle (IGCC) power plants, and more specifically to methods and apparatus for using diluent nitrogen with dry syngas in IGCC plants.

In at least some known IGCC plants and in certain operating conditions, diluent is mixed with syngas to improve the mass flow through a combustor. Nitrogen process gas from an air separator is commonly used as diluent. When additional diluent is needed, the syngas is saturated with water vapor, which acts as an additional diluent. However, the addition of water vapor in the syngas may cause variations in the heating value of the syngas. Such variations can lead to variances in firing temperature, and/or may adversely affect the performance and/or efficiency of the combustor. Moreover, moisture in the syngas adversely lowers the combustor firing temperature and combustor efficiency. As such, the possible adverse affects of the addition of water vapor may outweigh any benefits.

Thus, methods and apparatus to supply diluent to the combustor are desirable to maintain a constant heating value of the syngas. Maintaining a constant heating facilitates the combustor maintaining a constant firing temperature such that the combustor's performance and efficiency is also maintained. In addition, methods and apparatus to supply diluent to the combustor so that dry syngas can be burned efficiently are desirable to raise the combustor firing temperature and further enhance the combustor's performance and efficiency. Also desirable are methods and apparatus to facilitate enhancing the use of waste process heat to increase the efficiency of IGCC plants.

BRIEF DESCRIPTION OF THE INVENTION

In one aspect, a method for introducing diluent into a syngas stream in an integrated gasification combined cycle (IGCC) plant having a combustor is provided. The plant also includes a heat recovery steam generator. The method includes producing nitrogen process gas (NPG) and water vapor, saturating the NPG with the water vapor, raising the temperature of the saturated NPG using heat from the heat recovery steam generator (HRSG), waste process heat and compressor extraction air, and supplying essentially dry syngas to the combustor along with the saturated and heated NPG.

In another aspect, an embodiment of the present disclosure provides a method for using nitrogen saturation and heating to facilitate increasing the efficiency of an IGCC having a combustor. The method includes using low level process heat to pre-heat saturated diluent nitrogen and using low level process heat to heat steam turbine condensate.

In yet another aspect, an embodiment of the present disclosure provides an Integrated Gasification Combined Cycle (IGCC) apparatus. The apparatus includes a saturator configured to saturate NPG with water vapor, and a heat recovery steam generator (HRSG), a low pressure steam loop through the saturator, wherein the HRSG is configured to heat the low pressure steam loop. The apparatus further includes a compressor and a heat exchanger configured to heat the NPG using waste process heat and extraction air from the compressor, wherein the heated NPG thereby becomes diluent nitrogen.

BRIEF DESCRIPTION OF THE DRAWINGS

FIG. 1 is a block diagram of an exemplary Integrated Gasification Combined Cycle Plant (IGCC) including equipment used to supply saturated diluent and dry syngas to a combustor.

DETAILED DESCRIPTION

As used herein, the term syngas refers to synthesis gas made from partially oxidized hydro-carbonaceous feedstock. Syngas varies in its exact composition based on the feedstock used, but generally includes mostly carbon monoxide, hydrogen, water, carbon dioxide and may also include impurities such as hydrogen sulfide. Syngas is used as fuel in the combustor of at least some Integrated Gasification Combine Cycle (IGCC) plants.

In the exemplary embodiment, an IGCC plant 21 includes a gasifier 23 and a combustor 25 that is coupled in flow communication with a turbine 29 and a compressor 27. Compressor 27 is up stream from, and is in flow communication with turbine 29. Turbine 29 is rotatably coupled to an electrical generator 31 and turbine 29 is also in flow communication with a heat recovery steam generator (HRSG) 33. HRSG 33 is rotatably coupled to a steam turbine 35 that is also rotatably coupled to an additional electrical generator 37. In the exemplary embodiment, an air separator 39 is coupled in flow communication with gasifier 23 and combustor 25.

During operation, Gasifier 23 partially oxidizes hydro-carbonaceous feedstock to make syngas. Combustor 25 burns the syngas to produce high temperature, high-pressure gas. Compressor 27 compresses ambient air that is then discharged towards turbine 29 along with the high-pressure gas discharged from combustor 25. As the high-pressure gas expands, it induces rotation of turbine 29. As turbine 29 rotates, it powers electrical generator 31. HRSG 33 receives the hot gases discharged from turbine 29 and uses heat contained in such gases to boil water to produce steam. The resulting steam induces rotation of steam turbine 35, which powers electrical generator 37.

In the exemplary embodiment, IGCC plant 21 also includes saturator 41, heat exchanger 43, heat exchanger 45 and heat exchanger 47. In other embodiments, IGCC plant 21 does not include at least one of saturator 41, heat exchanger 43, heat exchanger 45, and/or heat exchanger 47.

In operation, air separator 39 receives ambient air and separates the received air into oxygen and nitrogen process gas (NPG) streams. The oxygen stream is channeled to gasifier 23 for use in partially oxidizing hydro-carbonaceous feedstock to make syngas. In the exemplary embodiment, the NPG contains approximately 95% nitrogen by weight and may contain oxygen, argon, and/or other trace atmospheric constituents. Moreover, in the exemplary embodiment, the NPG contains approximately 2% water vapor or less by weight. As the NPG exits air separator 39, the NPG is at approximately 250° F. (121° C.) and 320 psig (22.5 kg/square cm). Since this NPG is readily available and is non-combustible, in some embodiments, air separator 39 channels the NPG directly to combustor 25, where the NPG is used as a fuel diluent to facilitate increasing the mass flow through combustor 25. Increasing the mass flow through combustor 25 facilitates increase in the amount of thrust produced as the gas exits combustor 25.

As the NPG exits air separator 39, the NPG is channeled to saturator 41. In one embodiment, saturator 41 increases a trayed tower that enables NPG and low pressure steam to mix with little or no pressure losses. In other embodiments, saturator 41 may be other than a trayed tower. In the exemplary embodiment, the low pressure steam circulates from saturator 41 to HRSG 33 and is then returned to saturator 41. More specifically, in the exemplary embodiment, the steam exits saturator 41 at approximately 210° F. (99° C.) before it is heated in HRSG 33 to approximately 305° F. (152° C.)], prior to being returned to saturator 41 wherein it imparts its heat to the NPG. The saturated NPG that leaves saturator 41 contains approximately 16% water and is at approximately 285° F. (140° C.). In at least one embodiment, before the saturated NPG reaches combustor 25, the NPG is superheated to facilitate providing water condensation inside combustor 25 and to facilitate minimizing or at least reducing an amount of energy required by combustor 25. Reducing the amount of energy required by combustor 25 facilitates increasing the overall efficiency of combuster 25.

The saturated NPG is heated by heat exchanger 43 and by heat exchanger 45. After the saturated NPG leaves saturator 41, the NPG is routed through heat exchanger 43. In heat exchanger 43, waste process heat imparts its heat to the saturated NPG stream. In one embodiment, an operator may select the source of the waste process heat. In another embodiment, the source of waste process heat is preselected. Also, in some embodiments, extraction air from compressor 27 discharged at approximately 700° F. (371° C.), imparts its heat to the saturated NPG stream within heat exchanger 43. As the saturated NPG leaves heat exchanger 43, the NPG is at approximately 650° F. (343° C.) and 310 psig (22 kg/square cm). The saturated NPG is then channeled through heat exchanger 45. In heat exchanger 45, extraction air from compressor 27 at approximately 800° F. (427° C.) and 220 psig (15 kg/square cm) imparts its heat to the saturated NPG stream.

The saturated NPG is discharged from heat exchanger 45 at a temperature of approximately 680° F. (360° C.) and a pressure of between about 150 to about 300 pounds per square inch absolute (psia) (10.5-21 kg/square cm). In another embodiment, the saturated NPG is discharged from heat exchanger 45 at a pressure greater than 300 psia (21 kg/square cm). The saturated NPG is then channeled to combustor 25 for use as a diluent. The saturated NPG, essentially dry syngas, oxygen and carbon dioxide are injected into combustor 25. The use of dry syngas results in an approximately constant heating value of the fuel supplied to combustor 25. The constant fuel heating value facilitates combustor 37 operating with an approximately constant temperature and with an enhanced efficiency. The dry syngas may also have a constant, but low, moisture level.

Extraction air from compressor 27, at approximately 800° F. (427° C.), imparts some of its heat to the saturated NPG within heat exchanger 43. Extraction air is discharged from heat exchanger 43 at approximately 700° F. (371° C.), wherein the extraction air then imparts more of its heat to the saturated NPG in heat exchanger 45. Upon discharge from heat exchanger 45, the extraction air is at approximately 320° F. (160° C.). The extraction air then imparts more of its heat to condensate from steam turbine 35 in heat exchanger 47. The extraction air is discharged from heat exchanger 47 at approximately 130° F. (54° C.) and is channeled to air separator 39 for reuse.

In at least one known IGCC system, condensate from a steam turbine is heated in an HRSG. However, in embodiments of the present invention, HRSG 33 heats steam for use in saturator 41. Condensate from steam turbine 35 is heated with waste process heat. This source of this waste product heat is, in at least one embodiment, selectable by an operator, or in another embodiment, preselected from any other source.

One distinguishing feature of some embodiments of the present disclosure is that only the diluent nitrogen, and not the syngas, is saturated, and that HRSG 33 is the primary source of heat.

Condensate from steam turbine 35 is at approximately 100° F. (38° C.) when discharged from steam turbine 35. The condensate is channeled through heat exchanger 47 where it acquires some of the heat from extraction air discharged from compressor 25, as well as heat from waste process heat. After the condensate is discharged from heat exchanger 47 it is at approximately 210° F. (99° C.) and it is channeled to HRSG 33 for heating into steam for use by steam turbine 35.

The use of low level process heat to increase the temperature of the saturated NPG and the condensate from steam turbine 35 facilitates increasing the heat recovery of IGCC 21 and increasing its efficiency. More specifically, embodiments of the present invention provide methods and apparatus to supply diluent to the combustor maintain a constant heating value of the syngas. Maintaining a constant heating facilitates the combustor maintaining a constant firing temperature such that the combustor's performance and efficiency is also maintained. In addition, embodiments of the present invention provide methods and apparatus to supply diluent to the combustor so that dry syngas can be burned efficiently to raise the combustor firing temperature and further enhance the combustor's performance and efficiency. In addition, embodiments of the present invention provide methods and apparatus to facilitate enhancing the use of waste process heat to increase the efficiency of IGCC plants.

When introducing elements of the present invention or preferred embodiments thereof, the articles "a", "an", "the", and "said" are intended to mean that there are one or more of the elements. The terms "comprising", "including", and "having" are intended to be inclusive and allow additional elements other than the listed elements. The phrases "in one embodiment," "in at least one embodiment," or "in some embodiments" are not intended to limit the inclusion of any recited features and/or elements to exactly one embodiment. Features and/or elements described as being in any embodiment may be included in any other embodiment, unless such features and/or elements are mutually exclusive.

The temperatures, pressures, and other data recited herein represent or are indicative of operating conditions of an exemplary embodiment and are not necessarily intended as specifications required for any particular embodiment.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for introducing diluent into a syngas stream in an integrated gasification combined cycle (IGCC) plant having a combustor and a compressor, said method comprising:
   producing nitrogen process gas (NPG) and water vapor;
   saturating the NPG with the water vapor, such that the water vapor heats the saturated NPG to a first temperature;
   extracting air from the compressor;
   routing the extracted air from the compressor through at least two heat exchangers;
   increasing the temperature of the saturated NPG to a second temperature through the at least two heat exchangers using heat from the extracted air and a source of waste process heat; and
   supplying the saturated NPG at the second temperature along with essentially dry syngas to the combustor.

2. A method in accordance with claim 1 wherein said supplying the essentially dry syngas further comprises supplying essentially dry syngas at a constant moisture level.

3. A method in accordance with claim 2 further comprising operating the combustor at a substantially constant firing temperature.

4. A method in accordance with claim 1 wherein said supplying the essentially dry syngas further comprises supplying syngas having a constant heating value.

5. A method in accordance with claim 4 further comprising operating the combustor at a substantially constant firing temperature.

6. A method in accordance with claim 1 further comprising using a heat recovery steam generator to heat the water vapor supplied for use in said saturating the NPG.

7. A method in accordance with claim 1 further comprising:
   routing the extracted air from the at least two heat exchangers through a third heat exchanger: and
   increasing a temperature of condensate from a steam turbine at the third heat exchanger using heat from the extracted air.

8. A method in accordance with claim 7 further comprising routing the extracted air from the third heat exchanger to an air separator used for said producing NPG.

9. A method in accordance with claim 7 further comprising routing the heated steam turbine condensate from the third heat exchanger to a heat recovery steam generator.

10. A method for using nitrogen saturation and heating to facilitate increasing the efficiency of an integrated gasification combined cycle (IGCC) plant having a combustor and a compressor, said method including:
    producing nitrogen process gas (NPG) and water vapor;
    saturating the NPG with the water vapor;
    extracting air from the compressor;
    routing the extracted air from the compressor through at least two heat exchangers;
    routing a source of waste process heat to at least one of the at least two heat exchangers, wherein the at least two heat exchangers are used to increase a temperature of the saturated NPG; and
    routing the extracted air from the at least two heat exchangers through a third heat exchanger, wherein the third heat exchanger is used to increase a temperature of condensate from a steam turbine; and
    supplying essentially dry syngas to a combustor along with the saturated and heated NPG.

11. A method in accordance with claim 10 wherein supplying the essentially dry syngas further comprises supplying syngas that has a constant moisture level.

12. A method in accordance with claim 11 further comprising operating the combustor at a substantially constant firing temperature.

13. A method in accordance with claim 10 wherein supplying the essentially dry syngas further comprises supplying essentially dry syngas that has a constant heating value.

14. A method in accordance with claim 13 further comprising operating the combustor at a substantially constant firing temperature.

15. A method in accordance with claim 10 further comprising using a heat recovery steam generator to heat the water vapor supplied for use in said saturating the NPG.

\* \* \* \* \*